Figure 1:
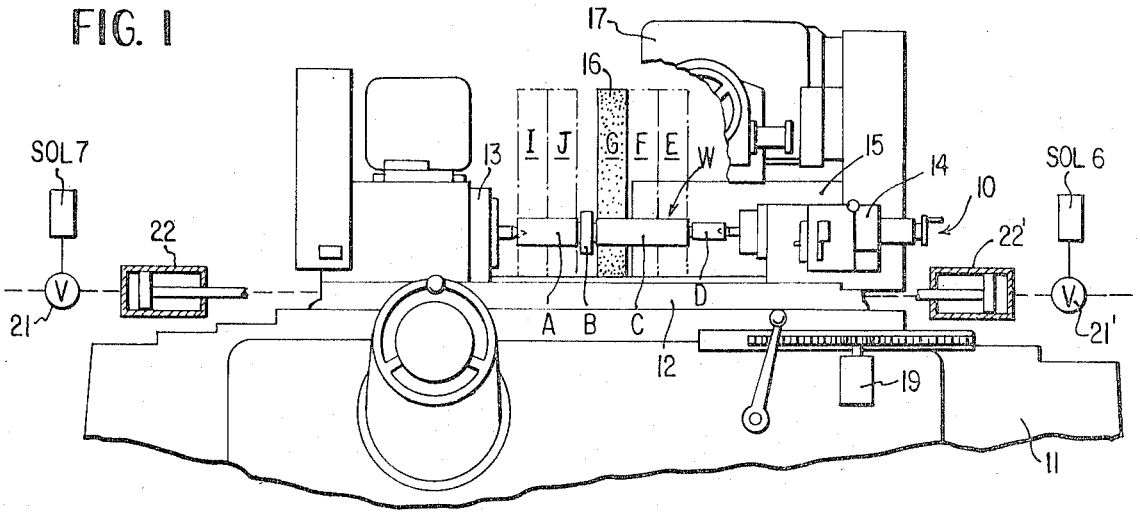
Figure 2:
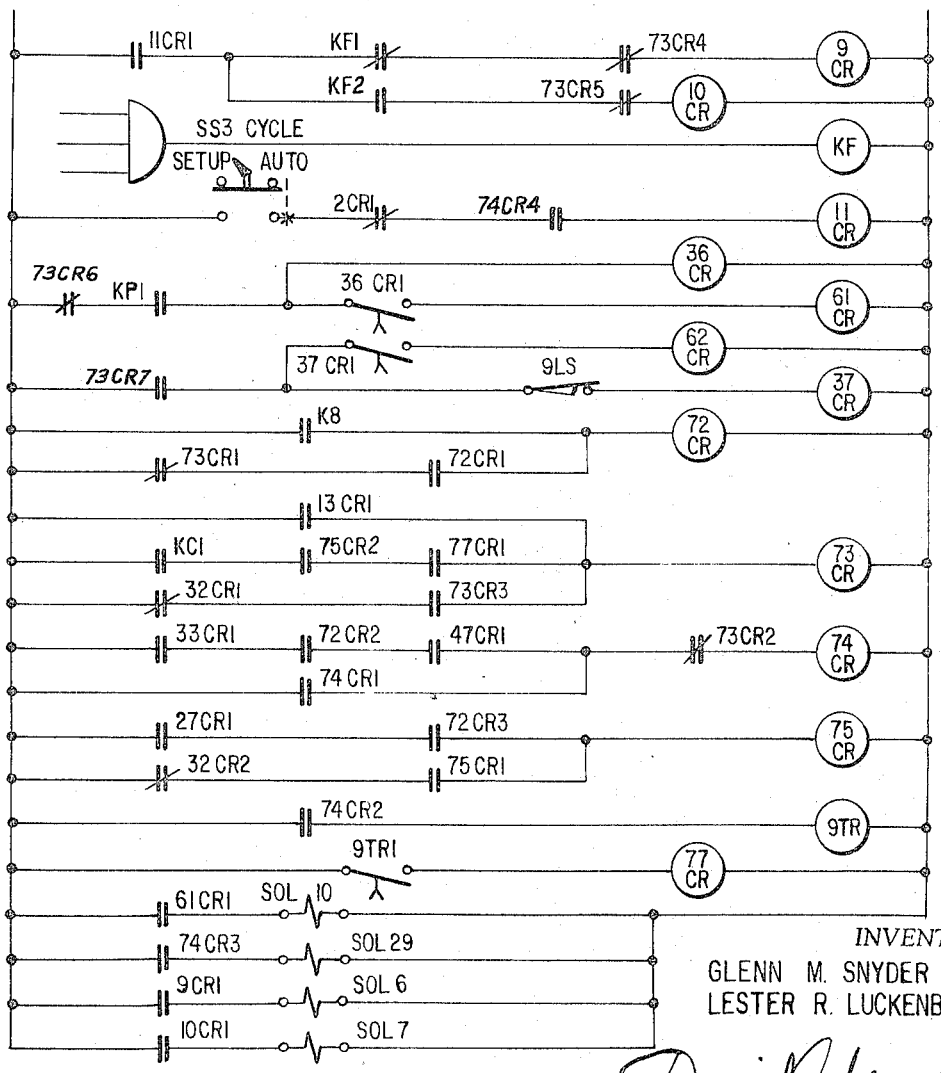

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 14, 1972

896 O.G. 421

T896,028

AUTOMATIC PLUNGE AND BLEND PASS CONTROL SYSTEM FOR GRINDING MACHINES

Glenn M. Snyder, Waynesboro, and Lester R. Luckenbach, Mont Alto, Pa., assignors to Landis Tool Company

Filed Feb. 26, 1971, Ser. No. 119,266
Int. Cl. B24b *49/00*
U.S. Cl. 51—165.77
1 Sheet Drawing. 15 Pages Specification

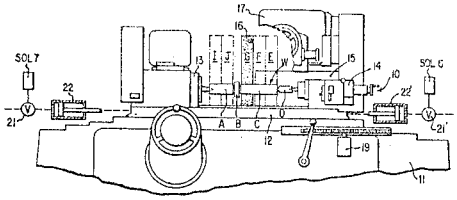

A control system in an automatic machine tool, such as a numerically controlled grinding machine (10), for effecting a series of longitudinally spaced plunge grind operations on a cylindrical workpiece (W) to provide constant size on the diameters (A and C) being ground. The control system is used when the length of the diameter to be ground is greater than the width of the grinding wheel (16), thus requiring more than one plunge grind. On the last plunge grind, the grinding wheel (16) is advanced inwardly a small increment beyond the previous infeed movements. The work support (12) and the workpiece (W) are then moved longitudinally so that the grinding wheel (16) will make a light cut along the previously ground length of the workpiece to provide a constant size and remove surface marks. The entire sequence is controlled by the punched tape or card, and an electric-hydraulic control circuit. The latter circuit is effective to hydraulically move the work support (12) longitudinally at the proper time in the grinding sequence to effect a "blend pass" operation. Of course, it is also possible to have different combinations of movements to effect the "blend pass" operation, such as (1) move the work support (12) both longitudinally and transversely; (2) move the wheel support (15) both longitudinally and transversely; or (3) move the work support (12) transversely and the wheel support (15) longitudinally.

March 14, 1972 G. M. SNYDER ET AL T896,028

AUTOMATIC PLUNGE AND BLEND PASS CONTROL SYSTEM FOR GRINDING MACHINES

Filed Feb. 26, 1971

INVENTORS,
GLENN M. SNYDER
LESTER R. LUCKENBACH

BY David Ackerman
ATTORNEY